United States Patent
Luo et al.

(10) Patent No.: US 11,188,536 B2
(45) Date of Patent: *Nov. 30, 2021

(54) AUTOMATICALLY CONNECTING EXTERNAL DATA TO BUSINESS ANALYTICS PROCESS

(71) Applicant: INTERNATIONAL BUSINESS MACHINES CORPORATION, Armonk, NY (US)

(72) Inventors: Lin Luo, Ontario (CA); Mohammed Mostafa, Ontario (CA); Changying Sun, Ottawa (CA); Graham Wills, Naperville, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 293 days.

This patent is subject to a terminal disclaimer.

(21) Appl. No.: 16/407,568

(22) Filed: May 9, 2019

(65) Prior Publication Data

US 2019/0266160 A1   Aug. 29, 2019

Related U.S. Application Data

(63) Continuation of application No. 15/816,528, filed on Nov. 17, 2017, now Pat. No. 10,956,420.

(51) Int. Cl.
*G06F 16/20* (2019.01)
*G06F 16/2453* (2019.01)
*G06F 16/2457* (2019.01)

(52) U.S. Cl.
CPC .. *G06F 16/24547* (2019.01); *G06F 16/24575* (2019.01)

(58) Field of Classification Search
None
See application file for complete search history.

(56) References Cited

U.S. PATENT DOCUMENTS

| 9,269,112 B1 | 2/2016 | Manimaran |
| 2006/0212265 A1 | 9/2006 | Amitay et al. |

(Continued)

FOREIGN PATENT DOCUMENTS

| CN | 103646111 A | 3/2014 |
| CN | 105989150 A | 10/2016 |

(Continued)

OTHER PUBLICATIONS

ISR / WO—Application No. PCT/IB2018/058763; Filed Aug. 11, 2018; dated Feb. 14, 2019; pp. 9.

(Continued)

*Primary Examiner* — Jau Shya Meng
(74) *Attorney, Agent, or Firm* — Cantor Colburn LLP; Steven Bouknight

(57) ABSTRACT

A big data analytics system includes an event monitoring controller that detects a user targeted event from an initial digital query data flow. An event conversion controller determines at least one contextual element associated with the at least one user targeted event, and automatically converts the at least one contextual element into a search criteria. An external data query builder controller automatically executes an external search query based on the search criteria. A data fusing controller automatically fuses the at least one contextual element generated from the at least one user targeted event, together with external search results generated from the external search query and the initial query data flow to generate a fused data file.

7 Claims, 7 Drawing Sheets

(56) References Cited

U.S. PATENT DOCUMENTS

| | | |
|---|---|---|
| 2007/0050393 A1 | 3/2007 | Vogel et al. |
| 2007/0088695 A1 | 4/2007 | Bleyendaal et al. |
| 2011/0314032 A1* | 12/2011 | Bennett ............... G06F 16/3344 707/749 |
| 2014/0201096 A1 | 7/2014 | Bank |
| 2015/0039646 A1 | 2/2015 | Sharifi |
| 2015/0170501 A1 | 6/2015 | Mukherji et al. |
| 2016/0196564 A1 | 7/2016 | Dadia |

FOREIGN PATENT DOCUMENTS

| | | |
|---|---|---|
| CN | 106202540 A | 12/2016 |
| CN | 106528725 A | 3/2017 |
| CN | 106940724 A | 7/2017 |

OTHER PUBLICATIONS

David Stodder; "Improving Data Preparation for Business Analytics" Best Practices Report Q3 2016, tdwi.org, p. 1-42.

List of IBM Patents or Patent Applications Treated as Related; Date Filed: Apr. 29, 2019, 2 pages.

Luo et al., "Automatically Connecting External Data to Business Analytics Process," U.S. Appl. No. 15/816,528, filed Nov. 17, 2017.

* cited by examiner

AUTOMATICALLY CONNECTING EXTERNAL DATA TO BUSINESS ANALYTICS PROCESS

DOMESTIC PRIORITY

This application is a continuation of U.S. patent application Ser. No. 15/816,528, filed Nov. 17, 2017, the disclosure of which is incorporated by reference herein in its entirety.

BACKGROUND

The present disclosure relates generally to database systems, and more particularly, to big data analytics processing systems.

Advancements in big data analytics and big data tool technologies have allowed corporations and businesses to leverage external data, such as weather data, geospatial data, and social media data, to achieve a more complete view of their business, marketing, and customer engagement. For example, businesses can leverage social media to identify and reward customers, gain insight into customer sentiment, and predict customer needs. As a result, obtaining external data is becoming an increasingly important part of any business analytics process.

With the advancement of big data analytical tools, many business analysis (BA) products provide user access to external data. These big data tools include, for example, data mining, predictive analytics, and/or machine learning tools which can be applied to sets of big data that often contain unstructured and semi-structured data. However, incorporating external data into business analytics still involves several manual operations to correctly query external data and correlate the queried results with a business's or user's own individual data.

SUMMARY

According to a non-limiting embodiment of the present invention, a big data analytics system includes an event monitoring controller that detects a user targeted event from an initial query data flow. An event conversion controller determines at least one contextual element associated with the at least one user targeted event, and automatically converts the at least one contextual element into a search criteria. An external data query builder controller automatically executes an external search query based on the search criteria. A data fusing controller automatically fuses the at least one contextual element generated from the at least one user targeted event, together with external search results generated from the external search query and the initial query data flow to generate the fused data file, According to another non-limiting embodiment of the invention, a method is provided to automatically generate a fused data file based on an initial query data flow obtained by a big data analytics system. The method comprises detecting, via an electronic event monitoring controller, at least one user targeted event from the query data flow, and determining, via an electronic event conversion controller, at least one contextual element associated with the at least one user targeted event. The method further comprises automatically converting, via the event conversion controller, the at least one contextual element into a search criteria, and automatically executing, via an electronic external data query builder controller, an external search query based on the search criteria. The method further comprises automatically fusing, via an electronic data fusing controller, the at least one contextual element generated from the at least one user targeted event, together with external search results generated from the external search query and the initial query data flow to generate the fused data file.

According to yet another non-limiting embodiment, a computer program product is provided to automatically generate a fused data file based on an initial query data flow obtained by a big data analytics system. The computer program product includes a computer readable storage medium having stored thereon program instructions that are executable by at least one electronic hardware controller. The program instructions comprises first program instructions executable by an electronic event monitoring controller to cause the event monitoring controller to detect at least one user targeted event from the query data flow. The instruction further comprises second program instructions that are executable by an event conversion controller, in signal communication with the event monitoring controller, to cause the conversion controller to determine at least one contextual element associated with the at least one user targeted event, and to automatically convert the at least one contextual element into a search criteria. The computer instruction further comprises third program instructions that are executable by an electronic external data query builder controller to cause the external data query builder controller to automatically execute an external search query based on the search criteria. The computer program instruction further comprises fourth program instructions that executable by an electronic data fusing controller to cause the data fusing controller to automatically fuse the at least one contextual element generated from the at least one user targeted event, together with external search results generated from the external search query and the initial query data flow to generate the fused data file.

Additional features are realized through the techniques of the present invention. Other embodiments are described in detail herein and are considered a part of the claimed invention. For a better understanding of the invention with the features, refer to the description and to the drawings.

DETAILED DESCRIPTION

Figure 1:
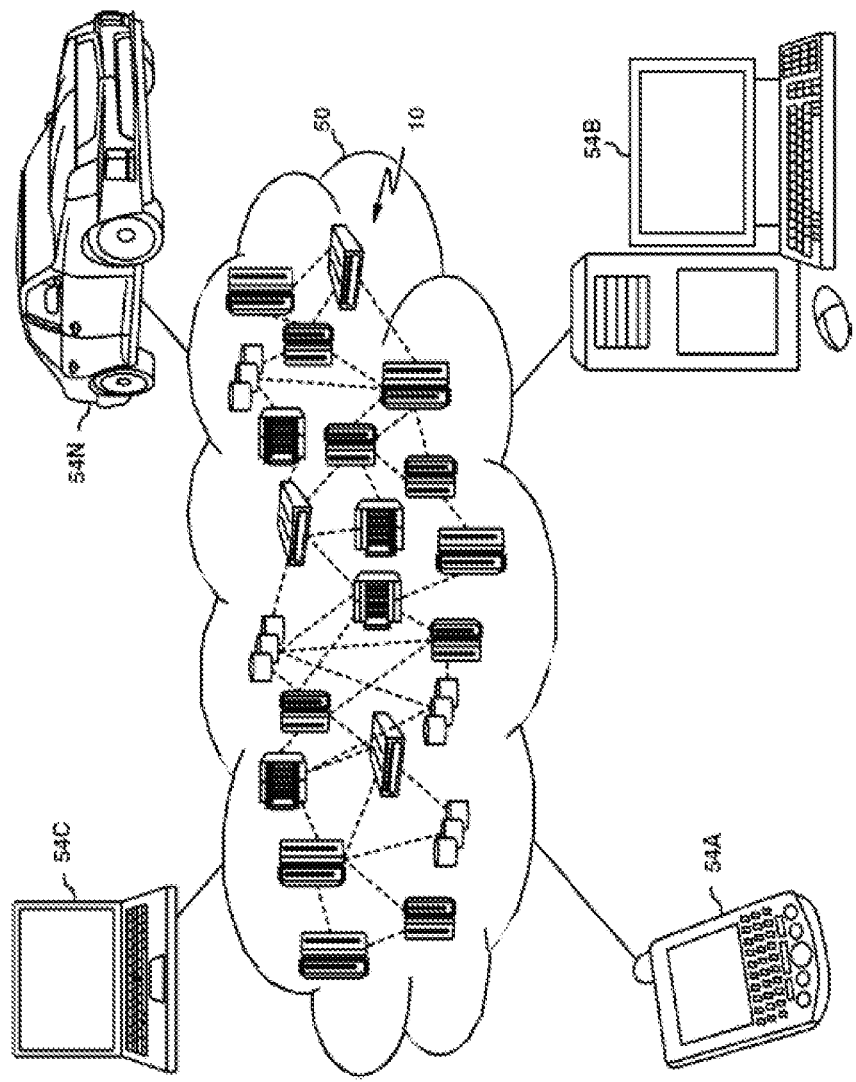
FIG. 1 depicts a cloud computing environment according to embodiments of the invention.

For the sake of brevity, conventional techniques related to database processing and analytics may or may not be described in detail herein. Moreover, the various operations and process steps described herein can be incorporated into a more comprehensive procedure or process having additional steps or functionality not described in detail herein. For example, some data analytical operations such as image recognition are well known and so, in the interest of brevity, many conventional steps will only be mentioned briefly herein or will be omitted entirely without providing the well-known process details.

Turning now to an overview of technologies that are more specifically relevant to aspects of various non-limiting embodiments of the invention, the data analytics process typically begins with data collection which aims to identify information that is targeted for a particular analytics application. Data from different source systems may be combined via data integration routines, transformed into a common format, and loaded into an analytics system such as a distributed data storage system (e.g., a Hadoop cluster, NoSQL database or data warehouse). In other cases, the collection process may include extracting a relevant data subset out of a stream of raw data that flows into a distributed data storage network, and then moving extracted data to a separate partition in the system so that it can be analyzed without affecting the overall data set.

Once the targeted data is isolated, analytical models are manually generated and are run against the collected data. Execution of the analytical models can involve sorting through large data sets to identify trends, patterns and relationships, predictive analytics (which seeks to predict customer behavior), equipment failures, and machine learning processes (e.g., artificial intelligence techniques that uses automated algorithms to churn through datasets). The results can then be communicated to business executives and other end users to provide decision-making assistance. The models that perform these data analytics, however, typically require substantial human manipulation, manual data input, and continuous data testing performed over long periods of time.

Turning now to an overview of various aspects of the invention, one or more non-limiting embodiments address the above-described shortcomings of the prior art by providing a big data analytics system that identifies elements associated with user interested events resulting from real-time data events (e.g., sudden trends, outliers, patterns, relationships, etc.). The big data analytics system converts the identified elements associated with the event as the context into search criteria. The identified elements associated with the event can be classified into components of ontologies included, but not limited to individuals, classes. Ontologies can further infer new information about identified elements, included, but not limited to attributes, relations, and synonyms. The above process produces a comprehensive description about the identified elements. The overall information generated can further be organized into a hierarchy of information properties such as for example, topics, context, and themes to create search criteria. Period and location may also be added as search criteria if the date, time, and/or geographic location are derived from the query data flow. A search query with these criteria is executed by external data providers, which will provide relevant processed results based on the search criteria. These results are automatically stitched to the original dataset so that user can perform a deeper analysis into abnormal events in the query to understand it further from external data dimensions.

The big data analytics system according to one or more non-limiting embodiments of the invention is also capable of automatically enriching user data with relevant external data, which may not be known to the user. In this manner, the data output by the big data analytics system is capable of expanding the user's analysis with additional insights and data correlations without any manual processes from the user while dramatically saving time and effort in their analysis process.

With reference now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
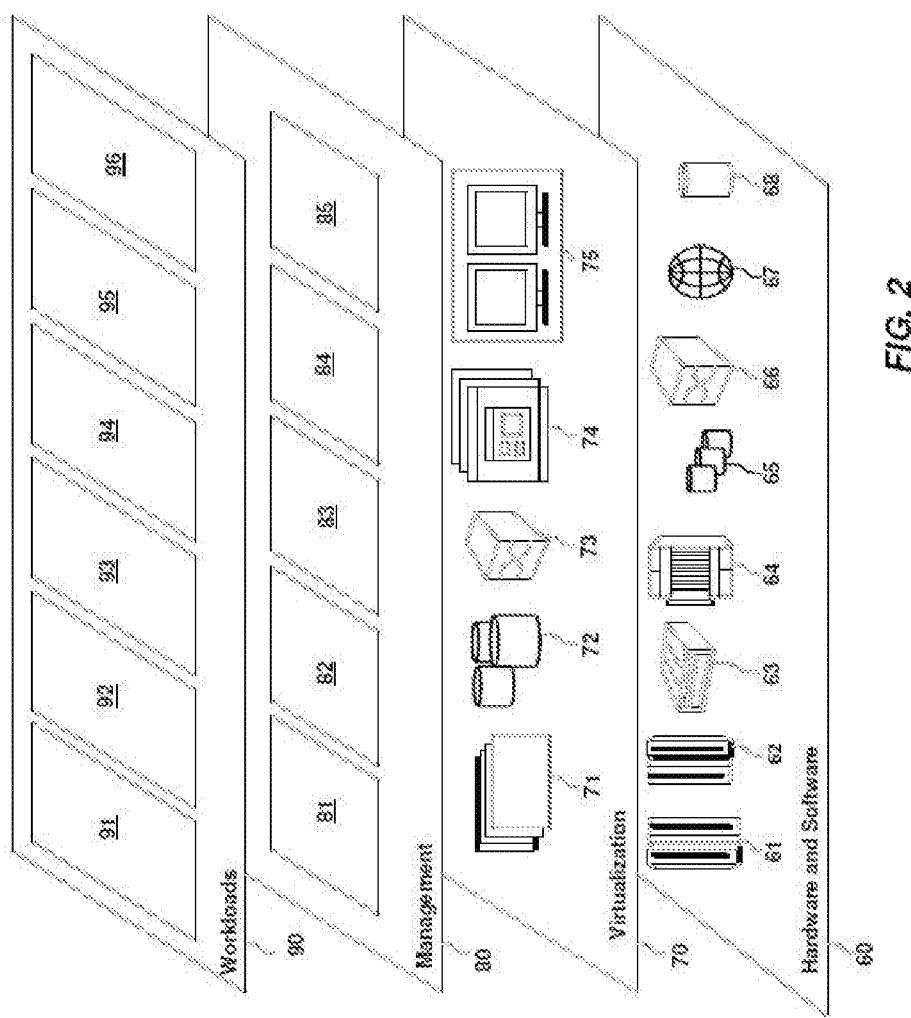
FIG. 2 depicts abstraction model layers according to embodiments of the invention.

Referring to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and input data analysis 96.

Figure 3:
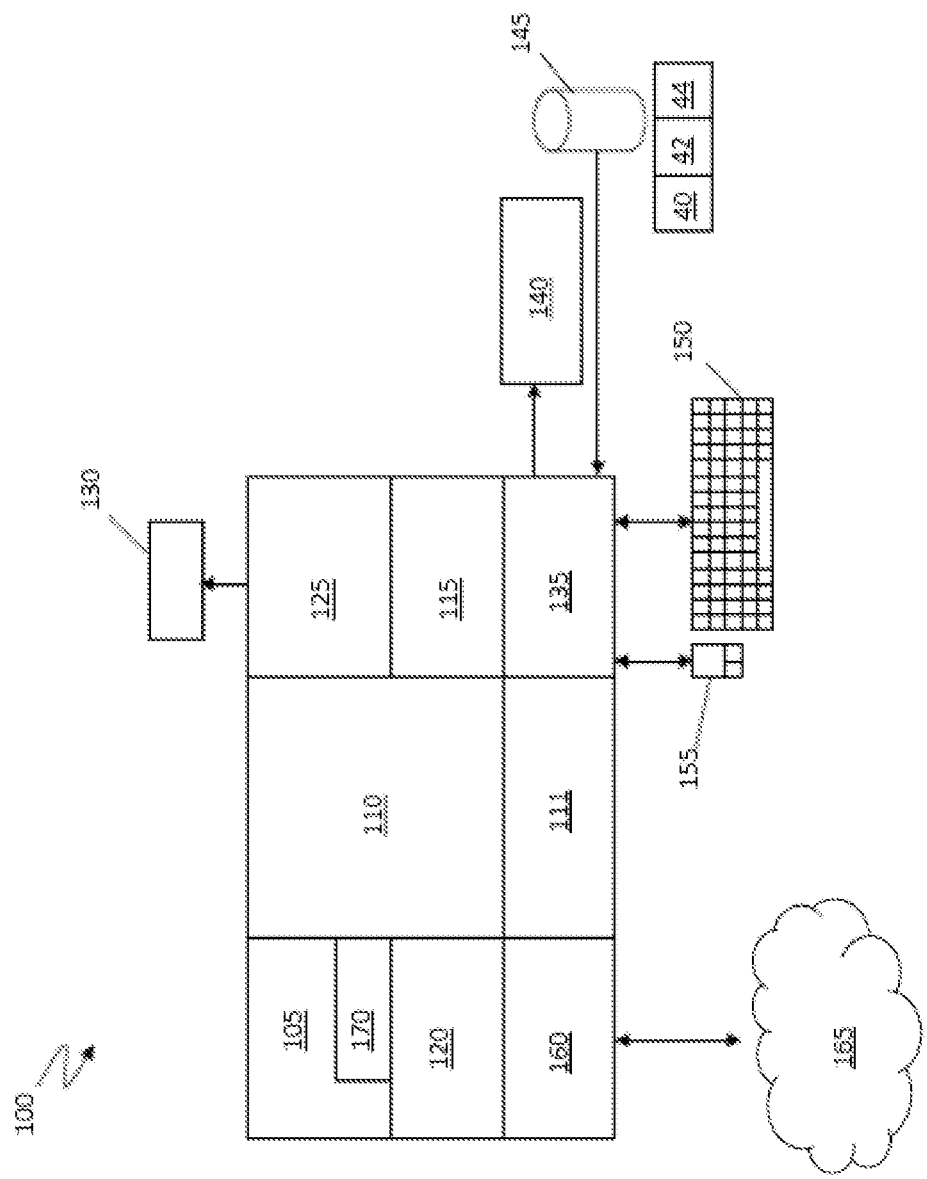
FIG. 3 depicts a communication apparatus according to embodiments of the present invention.

With reference to FIG. 3, a computing system 100 capable of performing big data analytics that identifies elements associated with user interested events resulting from real-time data events is illustrated according to one or more embodiments of the invention. The computing system 100 can include a computer, such as a server, a laptop computer, a tablet computer, a phone, and the like.

The computing system 100 includes, among other components, a processor 105, memory 110 coupled to a memory controller 115, and one or more input devices 145 and/or output devices 140, such as peripheral or control devices, which are communicatively coupled via a local I/O controller 135. These devices 140 and 145 may include, for example, battery sensors, position sensors (altimeter 40, accelerometer 42, GPS 44), indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the computing system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L9, and so on).

The memory 110 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 3, the instructions in the memory 110 include a suitable operating system (O/S) 111. The O/S 111 essentially may control the execution of other computer programs and provides scheduling, input-output control, file and data management, memory management, and communication control and related services.

Additional data, including, for example, instructions for the processor 105 or other retrievable information, may be stored in the storage, which may be a storage device 120 such as a hard disk drive or solid-state drive. The stored instructions in memory 110 or in storage 120 may include those enabling the processor to execute one or more aspects of the systems and methods described herein.

The computing system 100 may further include a display controller 125 coupled to a user interface or display 130. In some embodiments, the display 130 may be an LCD screen. In other embodiments, the display 130 may include a plurality of LED status lights. In some embodiments, the computing system 100 may further include a network interface 160 for coupling to a network 165. The network 165 may be an IP-based network for communication between the computing system 100 and an external server, client and the like via a broadband connection. In an embodiment, the network 165 may be a satellite network. The network 165 transmits and receives data between the computing system 100 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 4:
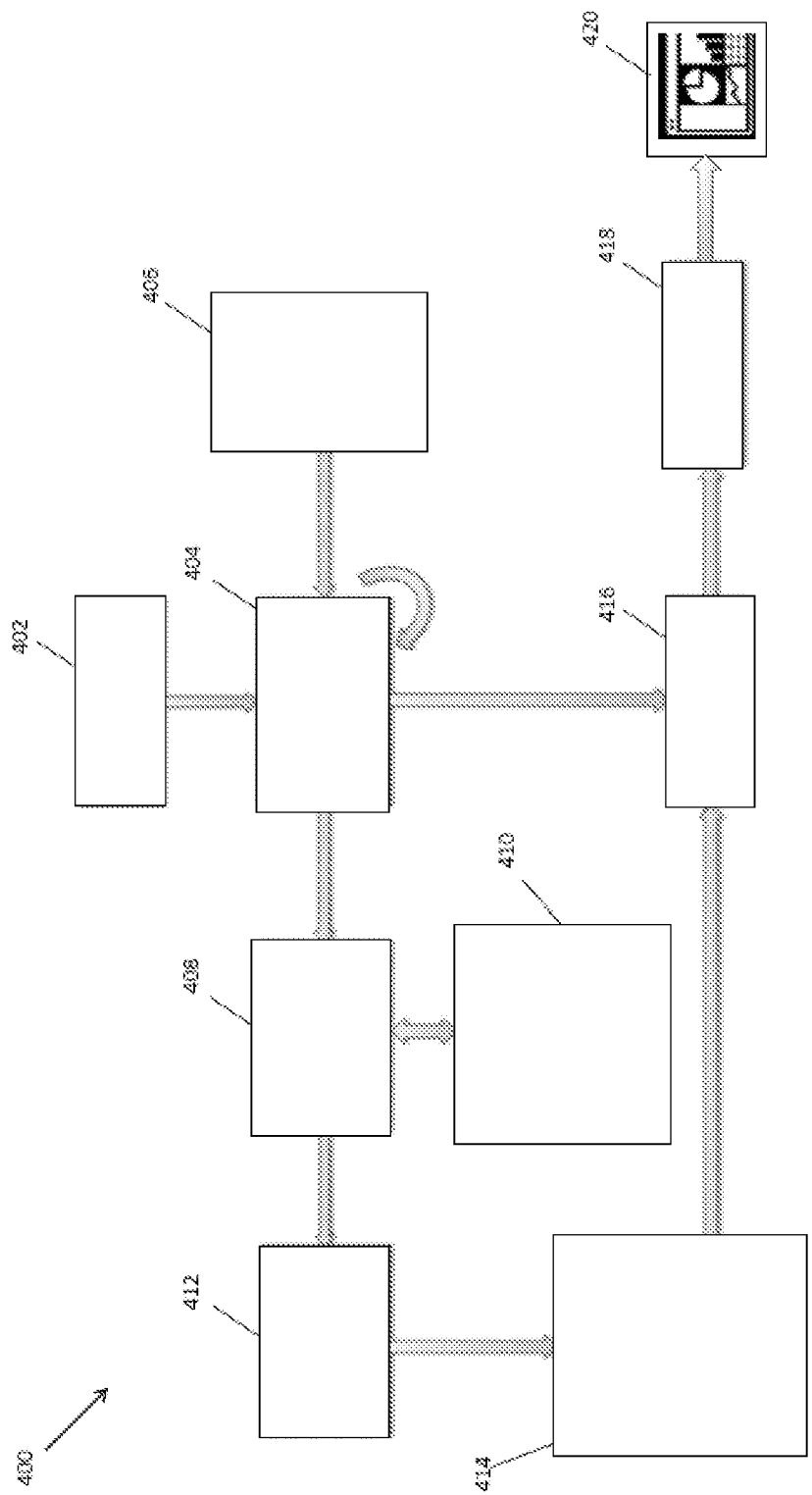
FIG. 4 is a block diagram of a big data analytics system according to a non-limiting embodiment.

Turning to FIG. 4, a big data analytics system 400 is illustrated according to a non-limiting embodiment. The big data analytics system 400 is configured to identify elements of user interested events or targeted user events specified by the user, which result from real-time data events (e.g., sudden trends, outliers, patterns, relationships, etc.). In at least one embodiment, the big data analytics system 400 converts the identified elements associated with the target event as contextual information, which in turn is utilized to automatically determine search criteria used to generate a search query. For example, the big data analytics system 400 can determine information about the identified elements using ontologies. The identified elements associated with the event can be classified into components of ontologies included, but not limited to individuals, classes. Ontologies can further infer new information about identified elements, included, but not limited to attributes, relations, and synonyms. The above process produces a comprehensive description about the identified elements. The overall information generated can further be organized into a hierarchy of information properties such as for example, topics, context, and themes to create search criteria. Accordingly, the big data analytics system 400 can output the search query to the external data controller 414, which can then provide relevant processed results.

The big data analytics system 400 is also capable of automatically "fusing" or "stitching" the original user data together with relevant external data. The relevant external data may not be known to the user. In this manner, the resulting fused data can enrich the analytical results provided to the user. The fused data file is then processed to generate a dashboard that provides a visual representation of the original user data, along with the relevant external data analytical results obtained from the search query. In this manner, the data output by the big data analytics system is capable of expanding the user's analysis with additional insights and data correlations without any manual processes from the user while dramatically saving time and effort in their analysis process.

According to a non-limiting embodiment, the big data analytics system 400 includes a query data controller 402, an event monitoring controller 404 in signal communication with a target event storage controller 406, an event conversion controller 408 in signal communication with an ontology controller 410, an external data query builder controller 412 in signal communication with an external data system that employs the external data controller 414, a data fusing controller 416, and a visualization rendering controller 418. Any one of the query data controller 402, event monitoring controller 404, target event storage controller 406, event conversion controller 408, ontology controller 410, external data query builder controller 412, external data controller 414, data fusing controller 416, and visualization rendering controller 418 can be constructed as an electronic hardware controller that includes memory and a processor configured to execute algorithms and computer-readable program instructions stored in the memory.

The query data controller 402 is configured to retrieve an initial query data flow in response to a query request input by a user or an application. The query request could be triggered by creating a visualization in a dashboard, running a report, building an analysis or a search. In a non-limiting example, the query data provider 402 is configured to retrieve data based on various customer actions. The actions include, but are not limited to, creating a financial performance comparison chart for a group of product; running a dashboard shows product sales analysis from different angles, for example, over time and geographic locations; running a service usage summary report, etc.

The event monitoring controller 404 is in signal communication with the query data controller 402 to receive the query data flow. The query data flow can include, for example, data corresponding to created financial performance comparisons for a group of product, dashboard data that correlates product sales analysis from different angles (e.g., product sales over time and geographic locations), and service usage summary reports. The event monitoring controller 404 is also in signal communication with the target event storage unit 406. The event storage unit 406 includes one or more registries that store one or more user-defined targeted events input by the user. In this manner, the event monitoring controller 404 monitors the query data flow (e.g., product impression, customer product reviews, click-through rate (CTR) data/web-site click history information, product basket placement, and final purchase information) and identifies or detects one or more targeted events therefrom which match a corresponding user-defined targeted event. The user-defined targeted events can include but are not limited to, customer purchasing trends, data patterns, product-to-customer purchase relationships, sudden breaking trends, and data relationship characteristics.

The event conversion controller 408 is in signal communication with the event monitoring controller 404 and the ontology controller 410 to generate one or more contextual elements associated with a detected target event. The event conversion controller 408 is also configured to automatically convert a contextual element into search criteria. The event conversion controller 408 automatically generates the search criteria based on the contextual element. In at least one non-limiting example, the contextual element is determined according to an ontological hierarchy generated by the ontology controller 410.

In at least one embodiment, the ontology controller 410 is in signal communication with the event conversion controller 408. The ontology controller 410 is capable of generating an ontological hierarchy based on the target events provided by the event conversion controller 408. The ontological hierarchy includes information describing properties such as, for example, individuals, classes, attributes, and relations based on the identified event elements in the query data flow. The ontological hierarchy information can further derive contextual information properties such as, for example, topics, context and themes of the identified event elements in query data flow. The information properties further include, for example time period information and location information, which can be determined by analyzing the query data flow.

Figure 5:
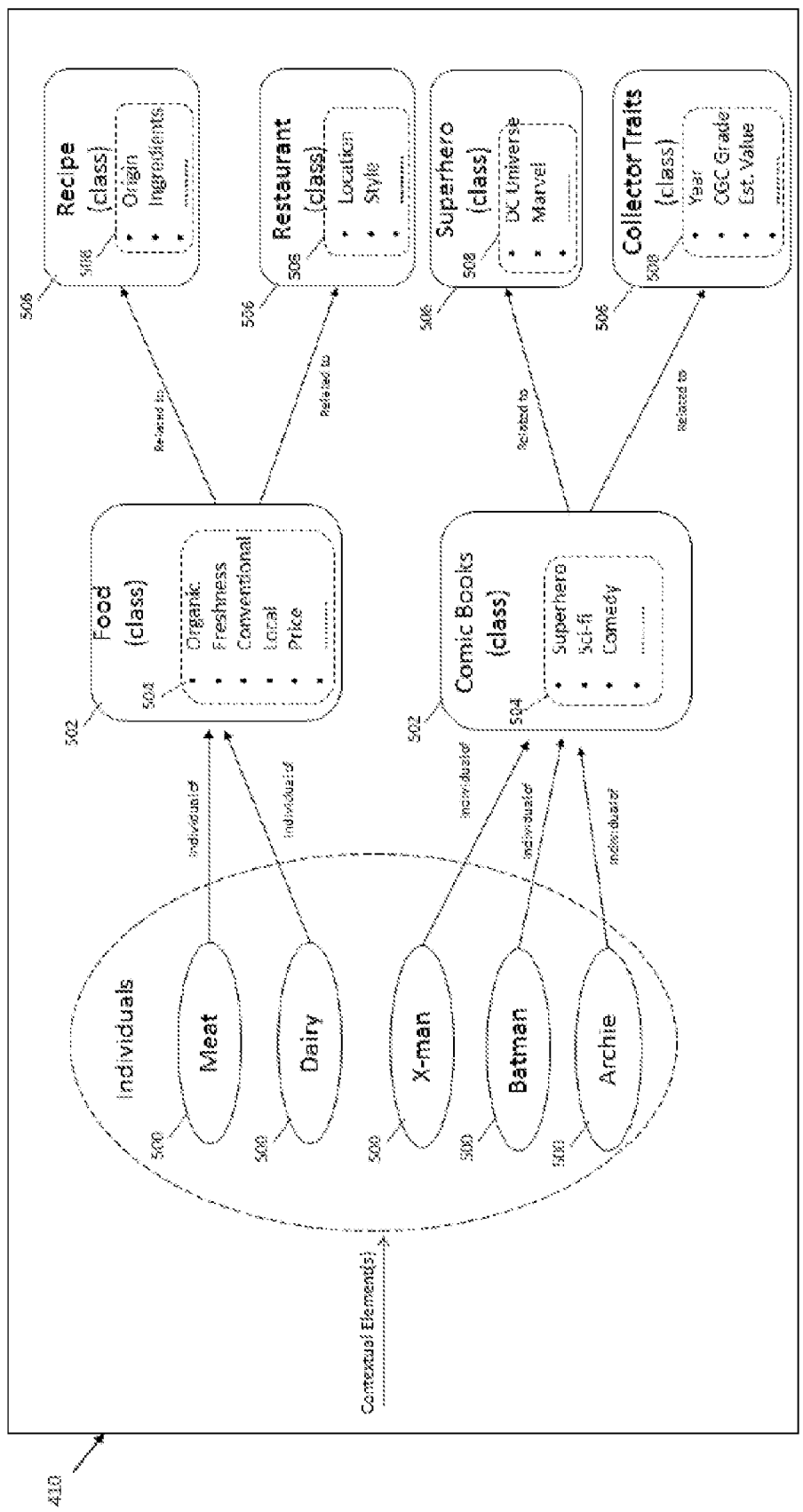
FIG. 5 illustrates an ontological hierarchy according to a non-limiting embodiment.

Referring to FIG. 5, for example, the ontology controller 410 determines one or more ontological individuals 500 based on one or more contextual elements determined by the event conversion controller 408. In at least one non-limiting embodiment, the ontology controller 410 determines an informational topic based on the ontological individual and expands the information topic to obtain a list of synonyms associated with the topic using lexical classification rules of the ontological individual.

The ontology controller 410 can also obtain further detailed information on the ontological individual. For example, the ontology controller 410 can identify a class 502 of the ontological individual and then determine one or more properties 504 of class 502.

In at least one embodiment, the ontology controller 410 determines an informational context based on the determined class 502 and expands the information context to obtain a list of synonyms associated with the context using lexical classification rules of the class 502. The determined class 502 can be associated with a related class 506 that is determined by the ontology controller 410. In this manner, the ontology controller 410 can generate an expanded synonyms list 508 for the determined context using lexical classification rules of the related classes The ontology controller 410 can also determine one or more attributes based on one or more selected properties corresponding to the class, and generate a second expanded list including one or more property synonyms for each determined attribute of the selected property. For example, an expanded synonym list for each determined attribute can be generated using lexical classification rules associated with the corresponding properties Referring again to FIG. 4, the external data query builder controller 412 is in signal communication with the external data system 414. The external data query builder controller 412 and the external data system 414 can work together to automatically execute an external search query based on the search criteria. For example, the external data query builder controller 412 can generate external data specific queries based on the one or more contextual elements associated with the detected targeted event. The external data system 414 receives the external search query from the external data query builder controller 412, performs the query and generates the external search results.

The data fusing controller 416 is in signal communication with the external data system 414 to receive the external search results. In at least one embodiment, the data fusing controller 416 automatically fuses or "stitches" the contextual elements generated from the least one user targeted event (UTE), together with external search results generated from the external search query and the initial query data flow to generate the fused data file. The fused data file can be output to the visualization rendering controller 418, which generates a display or graphical user interface (GUI) 420 that displays visual results of the fused data file, i.e., the contextual elements identified from the user's target events and the external search results generated using the external search query are automatically fused together with the original query data.

Figure 6:
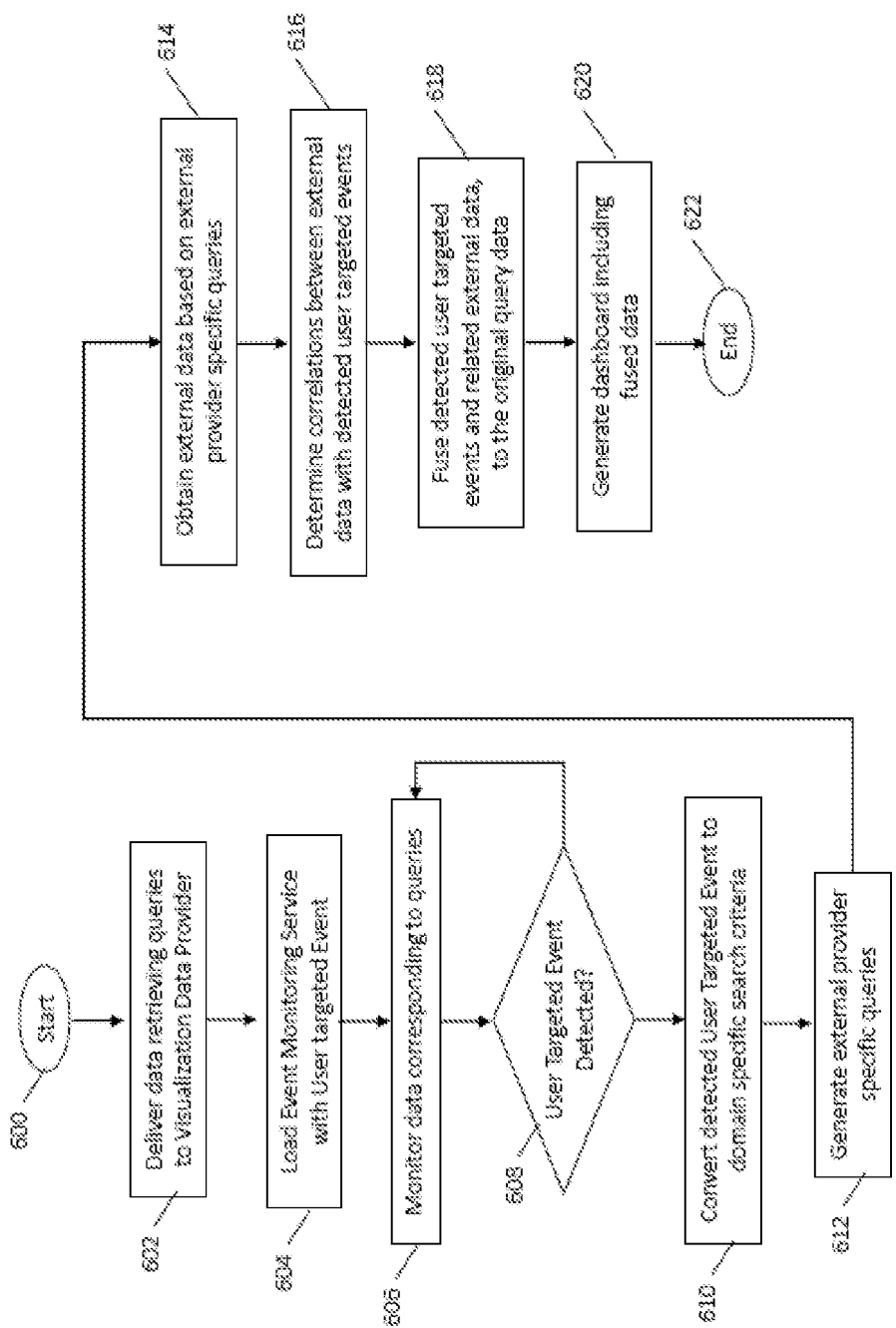
FIG. 6 is a flow diagram illustrating a method of automatically generating a fused data file that stitches together real time query data with external search results according to a non-limiting embodiment.

Turning now to FIG. 6, a method of automatically generating a fused data file based on queried data flow obtained by a big data analytics system is illustrated according to a non-limiting embodiment. The method begins at operation 600, and at operation 602 data retrieving queries are delivered to a query data controller (see FIG. 4). The data retrieving queries can include, for example, product impressions, customer reviews, click-through rate (CTR) data/website click history information, product basket placement, and final purchase information. At operation 604, an event monitoring service receives the real-time initial query data and determines one or more user-targeted events. At operation 606, the event monitoring service monitors the real-time query data, and determines whether a user targeted event (UTE) is included in the real-time query data at operation 608. When no user-targeted events are identified, the method returns to operation 606 to continue monitoring the real-time query data.

When, however, a user-targeted event is detected, the method converts the user targeted event into a domain specific search criteria at operation 610. At operation 612, external search criteria is automatically generated based on the identified user targeted event. At operation 614, a search query is executed based on the external search criteria, and external data is obtained in response to the search query. At operation 616, correlations between the external search results and the identified user targeted events are automatically determined. In at least one embodiment, the external search results include information that was previously unknown to the user. At operation 618, the related external results are automatically fused together with the user targeted events and/or the initial real-time query data associated with the user targeted events. In this manner, the external data results can be stitched together with the user targeted events to provide the user with insight as what real-time event triggered the detected user targeted event. For example, by stitching the previously unknown external data results and the user targeted event, together with the initial real-time query data, a user can determine which event occurring in real-time resulted in a user-targeted sales trend. At operation 620, a dashboard including the fused or "stitched" data can be generated and displayed on a GUI, for example, and the method ends at operation 622. Accordingly, the user is presented with visual results of the fused data file, i.e., the contextual elements identified from the user's target events and the external search results generated using the external search query are "stitched" together with the initial query data. Accordingly, the data output by the big data analytics system is capable of expanding the user's analysis with additional insights and data correlations without any manual processes from the user while dramatically saving time and effort in their analysis process.

Figure 7:
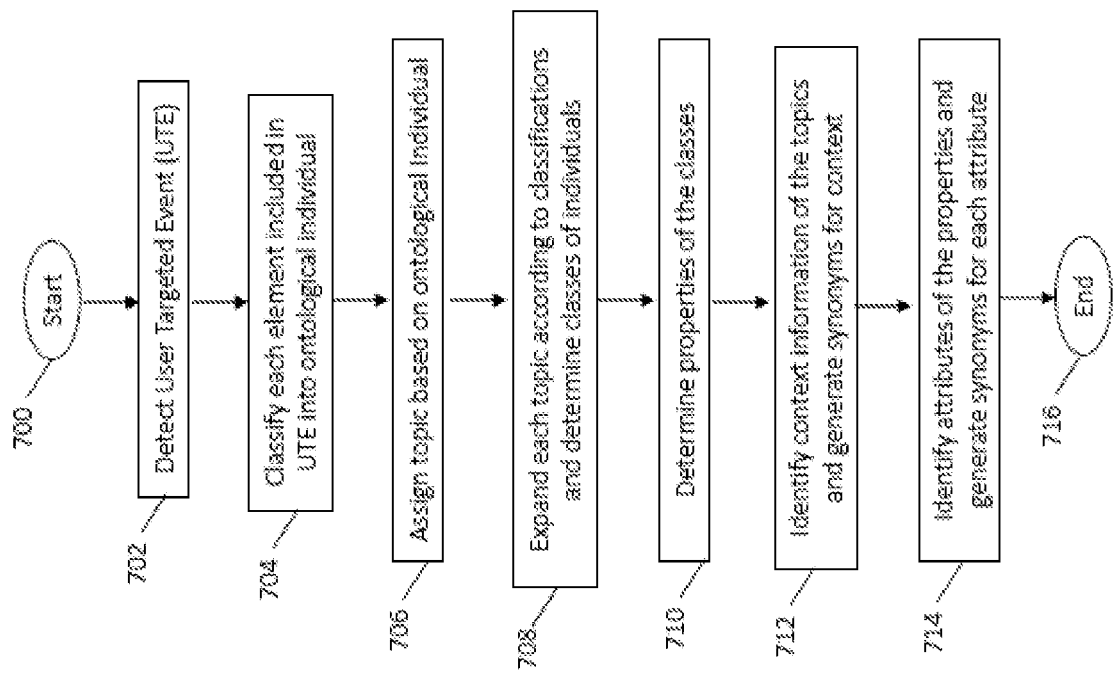
FIG. 7 is flow diagram illustrating a method of generating an ontological hierarchy according to a non-limiting embodiment.

Turning to FIG. 7, a method of generating an ontological hierarchy used to automatically generate domain specific search criteria used to perform an external search query is illustrated according to a non-limiting embodiment. The method begins at operation 700, and detects one or more user targeted events (UTEs) from initial query data (i.e., from an initial query data flow) obtained in real-time at operation 702. At operation 704, each element associated with a detected user targeted event is classified into an ontological individual. In at least one embodiment, the ontology controller (see FIG. 4) obtains an element associated with the detected user targeted event, and determines the ontological individual based on the element.

At operation 706, ontological individuals are mapped to corresponding topic classifications, a topic is assigned (e.g., by the ontology controller) based on each ontological individual. In at least one embodiment, the topic is expanded according to synonyms of the individual. The topic synonyms can be generated using lexical classification rules of the corresponding individual. At operation 708, each topic is expanded with a context i.e. class, according to the ontological individual's class membership. In at least one embodiment, the topic is expanded according to synonyms of the topic. The topic synonyms can be generated using lexical classification rules of the corresponding individual.

At operation 710, properties associated with the class are identified. In at least one embodiment, the ontology controller uses an identified individual to determine a corresponding class, and then determines the properties based on the determined class. At operation 712, content information of the topics is identified, and synonyms are generated for each attributed of the identified topic. At operation 714, the attributes of the properties are determined, the properties are expanded by generating a list of synonyms associated with the identified attributes of the properties, and the method ends at operation 716. In this manner, the ontology hierarchy generated by the ontology controller can be delivered to the event conversion controller 408, which in turn automatically generates external search criteria to be used to execute an external search query. The external query can provide external data results previously unknown to the user, which are then fused or "stitched" together with the initial real-time query data or user targeted events to enhance the user's analytical process.

As described herein, various non-limiting embodiments provide a big data analytics system that identifies elements, which includes user-targeted events resulting from real-time data events (e.g., sudden trends, outliers, patterns, relationships, etc.). The big data analytics system converts the identified elements associated with the detected user-targeted event as the context into search criteria. A search query with these criteria can be executed by the external data controller, which provides relevant processed results, unknown to the user, based on the search criteria. These results are automatically "stitched" to the original dataset so that user can perform a deeper analysis into abnormal events in the visualization to understand it further from external data dimensions. The big data analytics system is also capable of automatically enriching user data with relevant external data, which may not be known to the user. In this manner, the data output by the big data analytics system is capable of expanding the user's analysis with additional insights and data correlations without any manual processes from the user while dramatically saving time and effort in their analysis process.

Various embodiments of the invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "electrical communication" means any means of transferring an electrical signal from a first node to a second node including, but not limited to, wired connections and/or wireless connections.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, techniques related to database storage and processing may or may not be described in detail herein. For example, specific image recognition algorithms and/or learning algorithms can be implemented by the geo-spatial database system to perform various data queries and analytics. Although specific analytic algorithms operations used in implementing one or more embodiments of the present invention can be individually known, the described combination of operations and/or resulting structures of the present invention are unique. Thus, the unique combination of the operations described in connection with geo-spatial data analytics according to the present invention can implement a variety of individually known data processing and analytic operations, some of which are described in the immediately following paragraphs, while still providing a unique and novel system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method implemented by a computer processor to automatically generate a fused data file based on an initial query data flow obtained by a big data analytics system, the method comprising:

receiving, via an electronic event monitoring controller, an initial query data flow that includes at least one user targeted event resulting from a real-time data event occurring prior to performing a search query;

detecting, via the electronic event monitoring controller, at least one user targeted event from the initial query data flow;

retrieving, via a query data controller in signal communication with the event monitoring controller, the initial query data flow in response to a data request input by a user;

storing, via a target event storage unit in signal communication with the event monitoring controller, at least one user-defined targeted event input by the user;

determining, via an electronic event conversion controller in signal communication with the event monitoring controller, at least one contextual element associated with the at least one user targeted event;

automatically converting, via the event conversion controller, the at least one contextual element into a search criteria in response to generating an ontological hierarchy based on the at least one contextual element, wherein the ontological hierarchy includes a plurality of hierarchical properties and wherein a lower-hierarchy property among the plurality of hierarchical properties provides further detailed information with respect to an immediate higher-level property among the plurality of hierarchical properties;

determining, via an ontology controller in signal communication with the event conversion controller, at least one ontological individual based on the at least one contextual element, the ontological individual being an expandable property configured to generate the ontological hierarchy;

generating, via an external data system in signal communication with the external data query builder controller, the external search results based on the external search query;

delivering, via the external data system, the external search results to the data fusing controller;

automatically executing, via an electronic external data query builder controller, an external search query based on the search criteria;

automatically fusing, via an electronic data fusing controller, the at least one contextual element generated from the at least one user targeted event, together with external search results generated from the external search query and the initial query data flow to generate the fused data file; and generating, via a visualization rendering controller in signal communication with the data fusing controller, a graphical user interface (GUI) that displays visual results of the fused data file.

2. The method of claim 1, further comprising automatically converting, via the event conversion controller, the at least one contextual element in response to generating an ontological hierarchy based on the at least one contextual element.

3. The method of claim 2, wherein generating the ontological hierarchy further comprises generating an information property selected from a group comprising topics, context, and themes.

4. The method of claim 3, wherein generating the information properties further comprises generating expanded information selected from a group comprising individuals, classes, attribute, relations, time period, and location.

5. The method of claim 4, further comprising:
retrieving, via an electronic query data controller, the initial query data flow in response to a data request input by a user;

storing, via a target event storage unit, at least one user-defined targeted event input by the user;

determining, via an electronic ontology controller, at least one ontological individual based on the at least one contextual element;

generating, via an electronic external data system, the external search results based on the external search query, and delivering the external search results to the data fusing controller; and generating, via an electronic visualization rendering controller, a dashboard that correlates the at least one contextual element with the external search results; and generating a graphical user interface (GUI) that displays dashboard.

6. The method of claim 5, further comprising determining, via the ontology controller, at least one informational topic based on the at least one ontological individual.

7. The method of claim 6, further comprising determining, via the ontology controller, a class of the at least one ontological individual, and at least one property of the class.

* * * * *